United States Patent [19]

Murphy

[11] Patent Number: 4,835,935
[45] Date of Patent: Jun. 6, 1989

[54] SUPPORT STRUCTURE INCLUDING RIGHT ANGLE STUD BRACKET

[76] Inventor: Wesley T. Murphy, 94 Prospect St., Auburn, N.Y. 13021

[21] Appl. No.: 131,132

[22] Filed: Dec. 10, 1987

[51] Int. Cl.⁴ .............................................. E04C 3/30
[52] U.S. Cl. ...................................... 52/721; 52/726; 403/382; 403/403
[58] Field of Search ................. 52/217, 220, 475, 489, 52/656, 762, 726, 721; 403/205, 295, 402, 403, 382

[56] References Cited

U.S. PATENT DOCUMENTS

| | | | |
|---|---|---|---|
| 1,307,187 | 6/1919 | Disbro | 52/588 |
| 2,062,160 | 11/1936 | Calkins et al. | 52/762 |
| 3,636,672 | 1/1972 | Fink | 52/214 |
| 3,782,054 | 1/1974 | Goss, Jr. | 403/295 |
| 4,192,119 | 3/1980 | Murphy | 52/588 |
| 4,665,676 | 5/1987 | Drzemala | 52/656 |
| 4,691,486 | 9/1987 | Niekrasz et al. | 52/172 |
| 4,726,701 | 2/1988 | Thomas | 403/172 |

FOREIGN PATENT DOCUMENTS

| | | | |
|---|---|---|---|
| 2260014 | 10/1975 | France | 403/402 |
| 2379270 | 10/1978 | France | 403/402 |
| 2455669 | 1/1981 | France | 52/656 |
| 2518192 | 6/1983 | France | 403/403 |

Primary Examiner—James L. Ridgill, Jr.
Attorney, Agent, or Firm—Wall and Roehrig

[57] ABSTRACT

A building support structure that includes at least one elongated stud having a planer web and rectangular flanges joined to opposing longitudinal edges of the web with the bottom wall of each flange being co-planar with the web, a right angle bracket, each leg of which contains a pair of parallel slots passing downwardly from the top edge of the leg at equal distance to divide the leg into a center section having a width that is about equal to the width of the web and two end sections each having a width that is about equal to the inside width of each flange, the top portion of each end section being turned inwardly at an angle greater than 90 degrees to form a locking tab that has an interference fit with the inside section of each flange. One leg of the bracket is connected to the end of the stud by sliding the center section of the leg over the bottom surface of the web and the locking tab into opposing flanges of the stud whereby the stud is prevented from pulling out of the bracket.

8 Claims, 1 Drawing Sheet

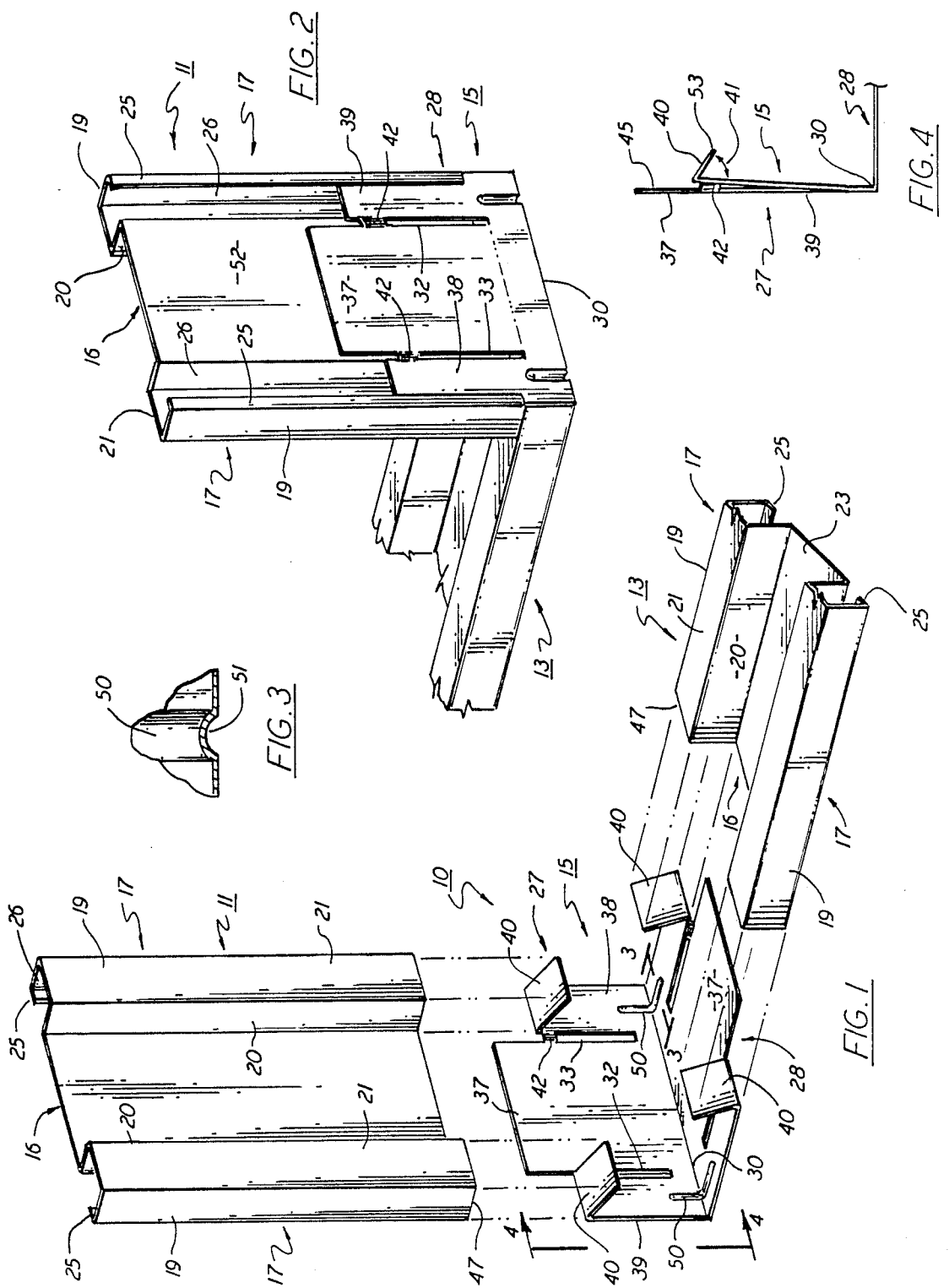

SUPPORT STRUCTURE INCLUDING RIGHT ANGLE STUD BRACKET

BACKGROUND OF THE INVENTION

This invention relates to a building support structure and in particular to a right angle bracket for joining two flanged metal studs.

In U.S. Pat. No. 4,192,119 there is disclosed a metal stud or beam that has a central elongated web and opposing rectangular flanges joined to the longitudinal edges of the web. The bottom surface of each flange is co-planar with respect to the web and is formed by a shortened lip that depends inwardly from the outside wall of the flange to create a longitudinal opening extending along the length of the web. The co-planar top walls of the opposing flanges are raised above the top surface of the web and are in parallel alignment therewith.

This particular double flanged stud geometry has proven to have wide application in the building industry because it can be used alone or in conjunction with other members to create a wide variety of different support structures that are used in framing a building. In some applications, a vertical support member must be securely connected to a horizontal support member, as for example, where a wall stud meets a floor joist. Making this type of connection sometimes requires drilling into the abutting members and screwing a bracket therebetween to securely hold the members in assembly. This type of threaded connection is time-consuming and difficult to form and the drilling of holes in the structural member tends to weaken the adjoining structure. The screwed-on brackets generally protrude outwardly from the studs at the connection, thus making the mounting of the wall panels and flooring over the studs extremely difficult.

SUMMARY OF THE INVENTION

It is therefore an object of the present invention to improve right angle connectors used to join metal studs in assembly.

It is a further object of the present invention to provide a right angle bracket for connecting two abutting beams wherein the bracket is snap-fitted into the beams to provide a secure, high strength connection therebetween.

Another object of the present invention is to eliminate the need for threaded fasteners when connecting two perpendicular aligned metal beams or studs.

Yet another object of the present invention is to provide a building support structure that includes a pair of perpendicularly aligned studs and a right angle connecting bracket having locking tabs that are slidably received in studs flanged to provide a tight, high strength joint between the joined members.

These and other objects of the present invention are attained by means of a building support structure that includes at least one elongated stud and a right angle corner bracket. The stud has a planer web and rectangular flanges joined to opposing longitudinal edges of the web with the bottom wall of each flange being co-planer with the web. The corner bracket contains two perpendicularly aligned legs, each of which includes a pair of parallel slots passing downwardly from the top edge of the leg an equal distance to divide the leg into a center section having a width that is about equal to the width of the web and two end sections, each of which has a width that is about equal to the inside width of the stud flanges. The top portion of each end section is turned inwardly at an angle greater than 90 degrees to form a locking tab that is capable of creating an interference fit with the inside opening of each flange. One leg of the corner bracket is slidably connected into one end of a stud by sliding the center section of the leg over the bottom surface of the web and the locking tabs into the opposing flanges. When fully inserted into the stud, the tabs prevent the stud from pulling out of the bracket. A second flange stud may be similarly connected to the other leg of the bracket to securely join the studs in assembly.

BRIEF DESCRIPTION OF THE DRAWINGS

For a better understanding of these and other objects of the present invention reference is had to the following detailed description of the invention which is to be read in conjunction with the associated drawings, wherein:

FIG. 1 is an exploded perspective view of a building support structure, embodying the teachings of the present invention, illustrating a pair of perpendicularly aligned studs and a corner bracket;

FIG. 2 is also a perspective view showing the studs and the corner bracket joined in assembly;

FIG. 3 is a view taken along lines 3—3 in FIG. 1, and;

FIG. 4 is an enlarged partial end view of the right angle brackets shown in FIG. 1 taken along lines 4—4.

DESCRIPTION OF THE INVENTION

Referring to the drawings, and in particular to FIG. 1, there is shown a building support structure generally referenced 10 that includes three separate members that are brought together in assembly to create an extremely tight, high strength right angle connection. It should be noted that the member can be joined together without the need of threaded fasteners or the like. The members include a vertical wall stud 11, a horizontal floor joist or stud 13, and a right angle corner bracket 15 which connects the two stud members together in assembly. As will be explained in further detail below, the right angle bracket can be used to connect beams or studs of similar construction in any type of application where the member must be brought together to form a right angle joint.

The studs utilized in the present support structure both embody the same structural features and are described in further detail in the above noted U.S. Pat. No. 4,192,119; the disclosure of which is herein incorporated by reference. Each stud is rolled from a single sheet of metal and includes an elongated planar web 16 and a pair of rectangular end flanges 17—17 that are joined to opposing edges of the web so that the flanges extend longitudinally along the entire length of the stud. Each flange consists of a pair of parallel side walls 19 and 20 that are joined by a flat top wall 21. The side walls are perpendicular to the plane of the web and support the top surface of the flange in parallel alignment with the web. The bottom wall of each flange is a shortened lip 25 that depends from the outer side wall 19 of the flange. A longitudinal opening 26 is thus established between the lip and the web that extends along the entire length of the stud.

The corner bracket 15 is formed from a single sheet of metal and consists of two identical perpendicular legs 27 and 28 that are connected along a bend line 30 (FIG. 1). Each leg has a pair of parallel slots 32 and 33 that pass downwardly from the top edge 35 of the leg towards the bender line. The slots terminate some distance above the bend line and serve to divide each leg into a center section 37 and two end sections 38 and 39. The width of the center section is about equal to the width of each stud web while the width of the two adjacent end sections is slightly less than the interior width of the end stud flange.

The top portion of each end section is turned inwardly to form a locking tab 40. The tab forms an angle 41 (FIG. 4) with the main body of each end section which is greater than 90 degrees. A strap 42 joins the center section of each leg with the adjacent end sections. As best seen in FIG. 4, the strap serves to hold or bias the end section inwardly so that the tabs are positioned slightly above the inside surface 45 of the center section. As will be described in further detail below, this arrangement permits the tabs to be slipped into the open ends 47—47 of the flanges when the members making up the support structure are brought together in assembly.

A pair of opposed right angle stiffeners 50—50 are also included in the structure of the corner bracket. Each stiffener spans the bend line of the bracket and extends longitudinally into the adjacent end sections. The stiffeners, as shown in FIG. 3, are formed in the corner bracket by crimping the sheet metal inwardly so that a crimp 51 extends outwardly from the bend line some distance into the adjacent end sections. To assemble the three members making up the support structure, the center section of one leg of the corner bracket is placed over the bottom surface 52 on the web of a receiving stub as shown in FIG. 2. The locking tabs of the bracket leg are then passed longitudinally into the open ends of the associated end flanges. The length of each tab is such that the tip 53 (FIG. 4) of the tab comes into sliding contact against the top wall of the receiving flange as the bracket moves into the stud. Because of the angle of the tab, the tab is depressed downwardly as it penetrates the flange to permit ease of entry. The tab will lock against the top wall of the receiving flange when the bracket is moved into opposite directions, thus preventing removal of the bracket.

As best seen in FIG. 2, one leg of the corner bracket is inserted fully into a receiving stud, which in this case is the floor stud of the assembly, to position the end face of the stud close to the opposing leg of the bracket. The second stud, which in this case is the wall stud, is then similarly passed over the other leg of the bracket and moved downwardly into abutting contact with the first stud. The three members are thus brought together in assembly to form a tightly joined support structure. Because of the action of the tabs against the receiving flanges, the corner bracket cannot be pulled out of the studs without damaging one of the co-joined members. In short, the strength of the joint is equal to or stronger than the strength of the members.

While this invention has been described in detail with respect to certain preferred embodiments, it should be recognized that the invention is not limited to those embodiments. Rather, many variations and modifications of these would be apparent to those of skill in the art, without departing from the scope and spirit of the invention, as defined in the appended claims.

I claim:

1. A building support structure that includes, at least one elongated stud having a planar web having a predetermined width and rectangular flanges having a predetermined inside width that is joined to opposing longitudinal edges of the so that a bottom surface of each flange is co-planar with said web,
   a right angle corner bracket having a pair of legs joined at a bend line, each leg of which contains a pair of parallel slots that pass downwardly from a top edge of the leg an equal distance to divide the leg into a center section having a width that is about equal to said width of the web, and two end sections each having a width that is about equal to said width of the flanges, the top portion of each end section being turned inwardly at an angle greater than 90 degrees to form a locking tab that is receivable inside one of said flanges,
   said corner bracket being slidably received in one end of said stud with said center section of a leg being positioned over the bottom surface of the stud web between the flanges and the locking tabs of said leg being positioned inside opposing flanges of said stud.

2. The support structure of claim 1 that further includes a second stud connected to the other leg of said corner bracket with the two studs being in abutting contact with each other.

3. The support structure of claim 1 wherein each tab has an interference fit with a receiving flange so that the tab is deformed inwardly by a flange surface that forms the top of the flange as said tab passes into said flange thereby locking the corner bracket to the stud.

4. The support structure of claim 3 wherein each flange has a bottom wall that is a shortened lip that depends inwardly from an outer side wall of the flange towards the web to provide a longitudinal opening in the bottom of the flange.

5. The support structure of claim 4 wherein each end section of the corner bracket legs is joined to the adjacent center section of the leg by at least one lateral strap that spans the elongated slot separating the two sections.

6. The support structure of claim 5 wherein the strap angularly displaces the end section inwardly in regard to the center section.

7. The support structure of claim 6 wherein the corner bracket further includes a pair of right angle stiffeners, each stiffener being mounted on either side of the bend line and extending outwardly into adjacent end sections of the corner bracket.

8. The support structure of claim 7 wherein each stiffener is a crimped brace formed in said adjacent end sections of the corner bracket.

* * * * *